United States Patent
Sugano

(10) Patent No.: US 11,915,027 B2
(45) Date of Patent: Feb. 27, 2024

(54) SECURITY AND DATA LOGGING OF VIRTUAL MACHINES

(71) Applicant: DENSO CORPORATION, Kariya (JP)

(72) Inventor: Yasuharu Sugano, Kariya (JP)

(73) Assignee: DENSO CORPORATION, Kariya (JP)

(*) Notice: Subject to any disclaimer, the term of this patent is extended or adjusted under 35 U.S.C. 154(b) by 719 days.

(21) Appl. No.: 17/039,696

(22) Filed: Sep. 30, 2020

(65) Prior Publication Data

US 2021/0019170 A1 Jan. 21, 2021

Related U.S. Application Data

(63) Continuation of application No. PCT/JP2019/005763, filed on Feb. 18, 2019.

(30) Foreign Application Priority Data

Apr. 2, 2018 (JP) .................................. 2018-071073

(51) Int. Cl.
  *G06F 9/455* (2018.01)
  *G06F 9/50* (2006.01)
  (Continued)

(52) U.S. Cl.
  CPC ........ *G06F 9/45558* (2013.01); *G06F 9/5027* (2013.01); *G06F 9/5077* (2013.01);
  (Continued)

(58) Field of Classification Search
  CPC .. G06F 9/45558; G06F 9/5027; G06F 9/5077; G06F 2009/45583
  See application file for complete search history.

(56) References Cited

U.S. PATENT DOCUMENTS 5,805,790 A    9/1998 Nota et al.
10,353,729 B1* 7/2019 Bell .......................... G06F 8/20
                (Continued)

FOREIGN PATENT DOCUMENTS

JP    H08263454 A    10/1996
JP    2005-309553 A  11/2005
              (Continued)

OTHER PUBLICATIONS

Wani et al. "Vehicle automation using controller area network", IRJET, vol. 3, Issue 2, Feb. 2016 (Year: 2016).*
(Continued)

*Primary Examiner* — Lewis A Bullock, Jr.
*Assistant Examiner* — Kevin X Lu
(74) *Attorney, Agent, or Firm* — Harness, Dickey & Pierce, P.L.C.

(57) ABSTRACT

An electronic control unit is configured to perform: allocating CPU resources to provide a plurality of virtual machines under a management by a hypervisor; monitoring an abnormality that occurs in one specific virtual machine by another virtual machine different from the specific virtual machine; outputting a stop request that requests stop of the allocation of the CPU resources to the specific virtual machine in a case that the abnormality is detected; and stopping allocation of the CPU resources to the specific virtual machine, by the hypervisor, in response to the stop request. The electronic control unit further comprises a DMA controller. The DMA controller transfers data transmitted to the specific virtual machine to a common memory which is common among a plurality of virtual machines.

9 Claims, 6 Drawing Sheets

(51) Int. Cl.
G06F 13/28 (2006.01)
*H04L 67/12* (2022.01)

(52) U.S. Cl.
CPC .... *G06F 13/28* (2013.01); *G06F 2009/45583* (2013.01); *G06F 2009/45587* (2013.01); *G06F 2009/45591* (2013.01); *G06F 2009/45595* (2013.01); *H04L 67/12* (2013.01)

(56) References Cited

U.S. PATENT DOCUMENTS

| | | | | |
|---|---|---|---|---|
| 11,372,706 | B2* | 6/2022 | Ishigooka | G06F 11/0772 |
| 11,442,768 | B2* | 9/2022 | Kumar | G06F 11/1469 |
| 2005/0235068 | A1 | 10/2005 | Moriki et al. | |
| 2010/0107158 | A1* | 4/2010 | Chen | G06F 11/203 |
| | | | | 718/1 |
| 2014/0122941 | A1* | 5/2014 | Pan | G06F 11/079 |
| | | | | 714/45 |
| 2014/0282470 | A1* | 9/2014 | Buga | G06F 8/65 |
| | | | | 717/170 |
| 2014/0372790 | A1* | 12/2014 | Antony | G06F 9/455 |
| | | | | 714/4.11 |
| 2015/0347264 | A1* | 12/2015 | Mohammed | G06F 9/45558 |
| | | | | 714/45 |
| 2015/0378759 | A1* | 12/2015 | Pershin | G06F 9/45558 |
| | | | | 718/1 |
| 2016/0266923 | A1 | 9/2016 | Miyoshi | |
| 2017/0090968 | A1* | 3/2017 | Tsirkin | G06F 13/404 |
| 2017/0300394 | A1* | 10/2017 | Raut | G06F 11/203 |
| 2018/0004558 | A1* | 1/2018 | Das Sharma | G06F 13/1663 |
| 2018/0232254 | A1* | 8/2018 | Mohan | G06F 3/0632 |
| 2018/0239896 | A1* | 8/2018 | Kato | G06F 12/14 |
| 2018/0239909 | A1* | 8/2018 | Tsirkin | G06F 9/45558 |
| 2019/0171585 | A1* | 6/2019 | Yonemura | G06F 21/78 |
| 2019/0227724 | A1* | 7/2019 | Schaefer | G06F 12/08 |
| 2019/0272219 | A1* | 9/2019 | Wei | G06F 11/2097 |
| 2021/0103455 | A1* | 4/2021 | Peter | G06F 11/1004 |

FOREIGN PATENT DOCUMENTS

| | | |
|---|---|---|
| JP | 2014126963 A | 7/2014 |
| JP | 2016-167143 A | 9/2016 |

OTHER PUBLICATIONS

Examiner search result for "flexray master slave ECU", and "controller area network master slave ECU" conducted on Jun. 10, 2023, with results limited to before Apr. 1, 2018. (Year: 2023).*

Sho Kawahara et al., A Migration Method for Continuing Out-of-band Remote Management. OS, 2015 vol. 1, p. 1-9, Yr 2015.

Shinya Honda et al., RTOS Integrated Virtual Machine Monitor with Hardware Virtualization Support for Automotive System. OS,: 2017, vol. 9, p. 1-7, Yr 2017.

* cited by examiner

SECURITY AND DATA LOGGING OF VIRTUAL MACHINES

CROSS REFERENCE TO RELATED APPLICATIONS

The present application is a continuation application of International Patent Application No. PCT/JP2019/005763 filed on Feb. 18, 2019, which designated the U.S. and claims the benefit of priority from Japanese Patent Application No. 2018-071073 filed on Apr. 2, 2018, the disclosure of which is incorporated herein by reference.

TECHNICAL FIELD

The present invention relates to an electronic control unit (ECU) for use in, for example, a vehicle.

BACKGROUND

A vehicle, e.g., an automobile, has various types of electronic control units connected to each other by an in-vehicle network such as CAN (Controller Area Network.) These electronic control units include those that control an operation of the vehicle such as an engine and steering wheel. In order to ensure vehicle safety, it is required to ensure security of the in-vehicle network and applications. In the above aspects, or in other aspects not mentioned, there is a need for further improvements in a security measure of virtual machines in an electronic control unit.

SUMMARY

According to the disclosure, an embodiment of an electronic control unit comprises: at least one processor which provide CPU resources, the CPU resources being subject to an allocation to provide a plurality of virtual machines under a management by a hypervisor; and at least one common memory which is common among the plurality of virtual machines. The electronic control unit is configured to perform: allocating the CPU resources to provide the plurality of virtual machines under by the hypervisor; monitoring an abnormality that occurs in one specific virtual machine of the plurality of virtual machines by another virtual machine different from the specific virtual machine; outputting a stop request that requests stop of the allocation of the CPU resources to the specific virtual machine in a case that the abnormality is detected; and stopping allocation of the CPU resources to the specific virtual machine, by the hypervisor, in response to the stop request. The electronic control unit further comprises a DMA controller which enables a Direct Memory Access, wherein the DMA controller transfers data transmitted to the specific virtual machine whose CPU resource allocation has been stopped to the common memory by the Direct Memory Access.

According to the disclosure, an embodiment of an electronic control system comprises: a master electronic control unit; and a slave electronic control unit connected to the master electronic control unit via a communication network and controlled by the master electronic control unit. At least one of the master electronic control unit and the slave electronic control unit comprises: at least one processor which provide CPU resources, the CPU resources being subject to an allocation to provide a plurality of virtual machines under a management by a hypervisor; and at least one common memory which is common among the plurality of virtual machines. The electronic control unit performs: allocating the CPU resources to provide a plurality of virtual machines under a management by a hypervisor; monitoring an abnormality that occurs in one specific virtual machine of the plurality of virtual machines by another virtual machine different from the specific virtual machine; outputting a stop request that requests stop of the allocation of the CPU resources to the specific virtual machine in a case that the abnormality is detected; and stopping allocation of the CPU resources to the specific virtual machine, by the hypervisor, in response to the stop request. The electronic control unit further comprises a DMA controller which enables a Direct Memory Access, wherein the DMA controller transfers data transmitted to the specific virtual machine whose CPU resource allocation has been stopped to the common memory by performing the Direct Memory Access.

According to the disclosure, an embodiment of a method performed in an electronic control unit including at least one processor which provide CPU resources, the CPU resources being subject to an allocation to provide a plurality of virtual machines under a management by a hypervisor and at least one common memory which is common among the plurality of virtual machines. The method comprises: providing a plurality of virtual machines by allocating the CPU resources provided by the processor in the electronic control unit under a management by a hypervisor; detecting an abnormality that occurred in one specific virtual machine among the plurality of virtual machines; outputting a stop request that stops an allocation of the CPU resources to the specific virtual machine in a case that the abnormality is detected; stopping the allocation of the CPU resources to the specific virtual machine in response to the stop request; and transferring by Direct Memory Access data transmitted to the specific virtual machine whose CPU resource allocation has been stopped to a common memory which is common among the plurality of virtual machines.

According to the disclosure, an embodiment may provide a non-transitory computer-readable storage medium storing instructions which, when executed by a computer, cause the computer to perform a method of an electronic control unit, the method comprises: providing a plurality of virtual machines by allocating the CPU resources provided by the processor in the electronic control unit under a management by a hypervisor; detecting an abnormality that occurred in one specific virtual machine among the plurality of virtual machines; outputting a stop request that stops an allocation of the CPU resources to the specific virtual machine in a case that the abnormality is detected; stopping the allocation of the CPU resources to the specific virtual machine in response to the stop request. The instructions may be installed into a computer having a DMA controller which enables a Direct Memory Access, wherein the DMA controller transfers data transmitted to the specific virtual machine whose CPU resource allocation has been stopped to the common memory by performing the Direct Memory Access.

According to the electronic control unit, the electronic control system, the processing method of the electronic control unit, and the processing program that can be executed by the computer according to the present disclosure, by stopping the allocation of the CPU resources when an abnormality occurs in a specific virtual machine. As a result, a security may be secured by preventing other virtual machine from being affected by the specific virtual machine. Further, by enabling the DMA transfer to the common memory, it is possible to receive and store communication data addressed to the specific virtual machine even if the CPU resources no longer allocated to the specific virtual machine even. Therefore, it is possible to continue to record the data regarding the specific virtual machine in which the abnormality has occurred.

The disclosed aspects in this specification adopt different technical solutions from each other in order to achieve their respective objectives. The objects, features, and advantages disclosed in this specification will become apparent by referring to following detailed descriptions and accompanying drawings.

BRIEF DESCRIPTION OF DRAWINGS

The invention is further described with reference to the accompanying drawings in which.

DESCRIPTION OF EMBODIMENT

Figure 1:
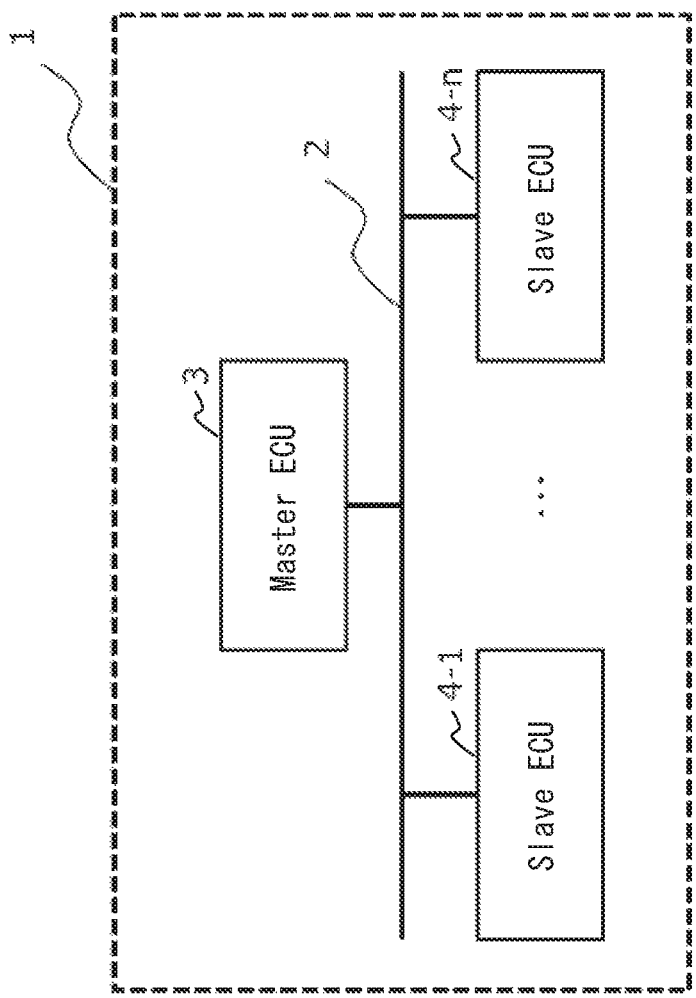
FIG. 1 is a diagram illustrating a configuration of an electronic control system.

Embodiments of the present disclosure will be described below with reference to the drawings.

Note that the present disclosure is not limited to the embodiments below. Further, at least words within the double quotation means words and phrases described in the claims, and is not limited to the following embodiments.

Configurations and methods described in dependent claims of claims, configurations and methods of following embodiments corresponding to configurations and methods described in dependent claims, and configurations and methods described only in the following embodiments without descriptions in claims should be interpreted as arbitrary configurations and arbitrary methods in this disclosure. In a case that the scope of claims is broader than descriptions of the embodiments, configurations and methods described in the following embodiments are just examples of configurations and methods of the present disclosure, which should be interpreted as arbitrary configurations and arbitrary methods in this disclosure. In any cases, essential configurations and methods of this disclosure should be interpreted based on independent claims.

Any effects described in embodiments are effects obtained when a configuration of an embodiment as an example of this disclosure, and are not necessarily an effect of this disclosure.

When there are a plurality of embodiments, the configuration disclosed in each embodiment is not limited to each embodiment alone, and may be combined across the embodiments. For example, the configuration disclosed in one embodiment may be combined with another embodiment. Further, the disclosed configurations may be collected and combined in each of the plurality of embodiments.

The problem described in this disclosure is not a publicly known problem, but person including the inventor has independently found out, and is a fact that affirms the inventive step of the invention together with the configuration and method of the present disclosure.

JP2014-126963A discloses a security for a system providing a plurality of virtual machines under a management by a hypervisor. In this system, when an abnormality occurs in one specific virtual machine among a plurality of virtual machines, the system cut off a communication of the specific virtual machine. The system enables both security for the system and continuous communication among remaining virtual machines.

According to the technique disclosed in JP2014-126963A, the security of another normal virtual machine can be secured by blocking the communication of the abnormal virtual machine. However, the communication of the abnormal virtual machine is blocked. The data transmitted to the abnormal virtual machine during a block period is lost without being recorded. The data transmitted to the abnormal virtual machine may include data useful to research purpose such as a subsequent analyze of an abnormality including an abnormality occurred in the virtual machine or an abnormality occurred in the electronic control unit or the vehicle. Therefore, it is desirable to properly log communication data just after the abnormality occurred or during the abnormality is occurring.

According to the present disclosure, an electronic control unit, an electronic control system and a method performed in an electronic control unit may be provided. The present disclosure makes it possible to improve security of virtual machines and to record data transmitted to the abnormal specific virtual machine even if no CPU resources is allocated to the abnormal specific virtual machine.

Configuration Common to Each Embodiment

FIG. 1 shows an in-vehicle electronic control system 1 to which a plurality of electronic control units are connected via a communication network 2. In FIG. 1, a master electronic control unit 3 and "n" slave electronic control units 4 are connected. The master electronic control unit 3 and the slave electronic control units 4 transmit and receive data via the communication network 2. Similarly, the plurality of slave electronic control units 4 may transmit and receive data between them. The communication network 2 may be provided by using, for example, any communication method such as Ethernet (registered trademark), Wi-Fi (registered trademark), Bluetooth (registered trademark), etc. in addition to communication methods such as CAN and LIN (Local Interconnect Network.)

The master electronic control unit 3 is, for example, an electronic control unit having a gateway function and a communication function with a device located outside the vehicle. The slave electronic control unit 4 is an electronic control unit that is controlled based on an instruction transmitted from the master electronic control unit 3. The slave electronic control unit 4 may be, for example, a drive system electronic control unit that controls an engine, a steering wheel, a brake, etc. The slave electronic control unit 4 may be, for example, a vehicle-body electronic control unit that controls a meter, and a power window, etc. The slave electronic control unit 4 may be, for example, an information-system electronic control unit such as a navigation device. The slave electronic control unit 4 may be, for example, a safety-control electronic control unit that controls to prevent a collision with an obstacle or a pedestrian. However, neither the master electronic control unit 3 nor the slave electronic control unit 4 is limited to the above example. Further, the master electronic control unit 3 may include the function of the slave electronic control unit.

At least one of the master electronic control unit 3 and the slave electronic control units 4 among the electronic control units configuring the vehicle-mounted system 1 has the configuration and function of the electronic control unit of each embodiment described in detail below.

First Embodiment

The configuration of the electronic control unit 10 of the first embodiment will be described with reference to FIG. 2. The "electronic control unit" of the present disclosure provides "a plurality of virtual machines" which are managed by a hypervisor. The electronic control unit 10 illustrated in FIG. 2 includes a first virtual machine 100 and a second virtual machine 200, a hypervisor 300 that manages these virtual machines, and a common memory 401 that is hardware, and a DMA controller 402. Each of the first and second virtual machines 100 and 200 has a guest OS installed on the virtual machine and a plurality of applications installed on the guest OS.

Here, the "electronic control unit" of the present disclosure is, for example, mainly configured by a semiconductor device. The "electronic control unit" of the present disclosure may be, for example, a so-called information processing device which has a possessor such as a CPU (Central Processing Unit) and a volatile storage unit such as a RAM (Random Access Memory). In this case, the information processing device may further include a nonvolatile storage unit such as a flash memory, a network interface unit connected to a communication network, or the like. In addition, such an information processing device may be a packaged semiconductor device or a configuration in which respective semiconductor devices are connected by wiring on a wiring board.

Further, the "plurality of virtual machines" of the present disclosure may include one virtual machine and another virtual machine, and may further include other virtual machines.

The electronic control unit 10 further has a "non-secure area" and an "secure area". The secure area is an area inaccessible from the non-secure area. The non-secure area and the secure area are configured by the hypervisor 300. In the embodiment shown in FIG. 2, the first virtual machine 100 and the common memory 401 are provided in the non-secure area, and the second virtual machine 200 and the hypervisor 300 are provided in the secure area. However, the hypervisor 300 does not necessarily have to be provided in the secure area.

Here, the "non-secure area" in the present disclosure refers to an area accessible from both the "non-secure area" and the "secure area". Further, the "secure area" in the present disclosure refers to an area that cannot be accessed from the "non-secure area" but can be accessed only from the same "secure area".

The first virtual machine 100 of the plurality of virtual machines has an application execution unit 101 that executes an arbitrary application. The first virtual machine 100 may correspond to one specific virtual machine in which a security related abnormality may occur. The application execution unit 101 is shown as "APP Exec. 101" in the drawings.

On the other hand, the second virtual machine 200 has a monitoring module 201. The second virtual machine 200 may correspond to another virtual machine which monitors an abnormality of the first virtual machine. Although the monitoring module 201 is provided in the second virtual machine 200 in this embodiment, the monitoring module 201 may be provided in different one of other virtual machines or different other virtual machines. A plurality of functions of the monitoring unit 201 described later may distributed to other virtual machines, for example. That is, the second virtual machine 200 may have one of the functions of the monitoring module 201, and the third virtual machine (not shown) may have another function of the monitoring unit 201.

Here, the "other virtual machine" of the present disclosure may be configured by one virtual machine or may be configured by a plurality of virtual machines. When configured with a plurality of virtual machines, the function of the monitoring module may be provided across these plurality of virtual machines.

The monitoring module 201 of the second virtual machine 200 monitors the virtual machines in the non-secure area that may cause an abnormality due to cyber attacks or the like. Then, in a case that the monitoring module 201 detects the abnormality that has occurred in the first virtual machine 100 among the plurality of virtual machines, the monitoring module 201 outputs an allocation stop request that requests stop of "an allocation of the CPU resources" to the first virtual machine 100 where the abnormality is detected. The allocation stop request may correspond to a stop request. The allocation stop request outputs to the hypervisor 300.

Here, "to detect" in the present disclosure means that the monitoring module 201 detects an abnormality of the specific virtual machine by monitoring the specific virtual machine and the like, and also the monitoring module 201 detects an abnormality of the specific virtual machine by receiving information data indicating that the abnormality has occurred from other modules.

Further, the "allocation of CPU resources" of the present disclosure means placing the CPU in a state where the CPU is usable to perform functions. The "CPU" of the present disclosure includes a general-purpose central processing unit as well as a dedicated central processing unit, and the name of the microcomputer or the like does not matter.

The monitoring module 201 further "detects" that the abnormality that has occurred in the first virtual machine 100 has been recovered by monitoring the first virtual machine 100. Then, in a case that the monitoring module 201 detects the recovery of the abnormality that has occurred in the first virtual machine 100, the monitoring module 201 outputs an allocation restart request for requesting restart of "CPU resource allocation" for the first virtual machine 100. The allocation restart request corresponds to a restart request.

The hypervisor 300 is provided with an allocation control module 301. The allocation control module 301 controls allocation of CPU resources to each virtual machine provided by the electronic control unit 10. The allocation control module 301 allocates the CPU resources to the plurality of virtual machines. If a number of the virtual machines are changed by the hypervisor 300, the allocation control module 301 may reallocate the CPU resources to the virtual machines. The allocation control module 301 stops the allocation of the CPU resources to the specific virtual machine in response to the stop request. The allocation control module 301 may restart the allocation of the CPU resources to the specific virtual machine in response to a disappearance of the stop request or a request to provide the specific virtual machine.

The common memory 401 is a random access memory provided in the non-secure area. The random access memory is a volatile memory and includes various types of memories such as SRAM and DRAM.

The DMA controller 402 performs DMA transfer of "data" from a peripheral device (not shown) connected via the bus to the common memory 401. The DMA controller 402 is a hardware circuit.

In the present embodiment, the configuration has been described in which the DMA controller 402 performs the DMA transfer of data to the common memory 401 by the DMA transfer both during the normal operation before the abnormality occurs in the specific virtual machine and after the occurrence of the abnormality. However, electronic control unit 10 may be configured to perform a PIO (Programmed I/O) transfer until an abnormality occurs in the specific virtual machine, and the DMA transfer is started when the abnormality occurs in the specific virtual machine. In either case, the DMA controller 402 performs the DMA transfer in which the data transmitted to the specific virtual machine whose CPU resource allocation has been stopped to the common memory.

Here, the "data" of the present disclosure includes not only the data handled by the application but also a log indicating a history of the application or the system.

Figure 3:
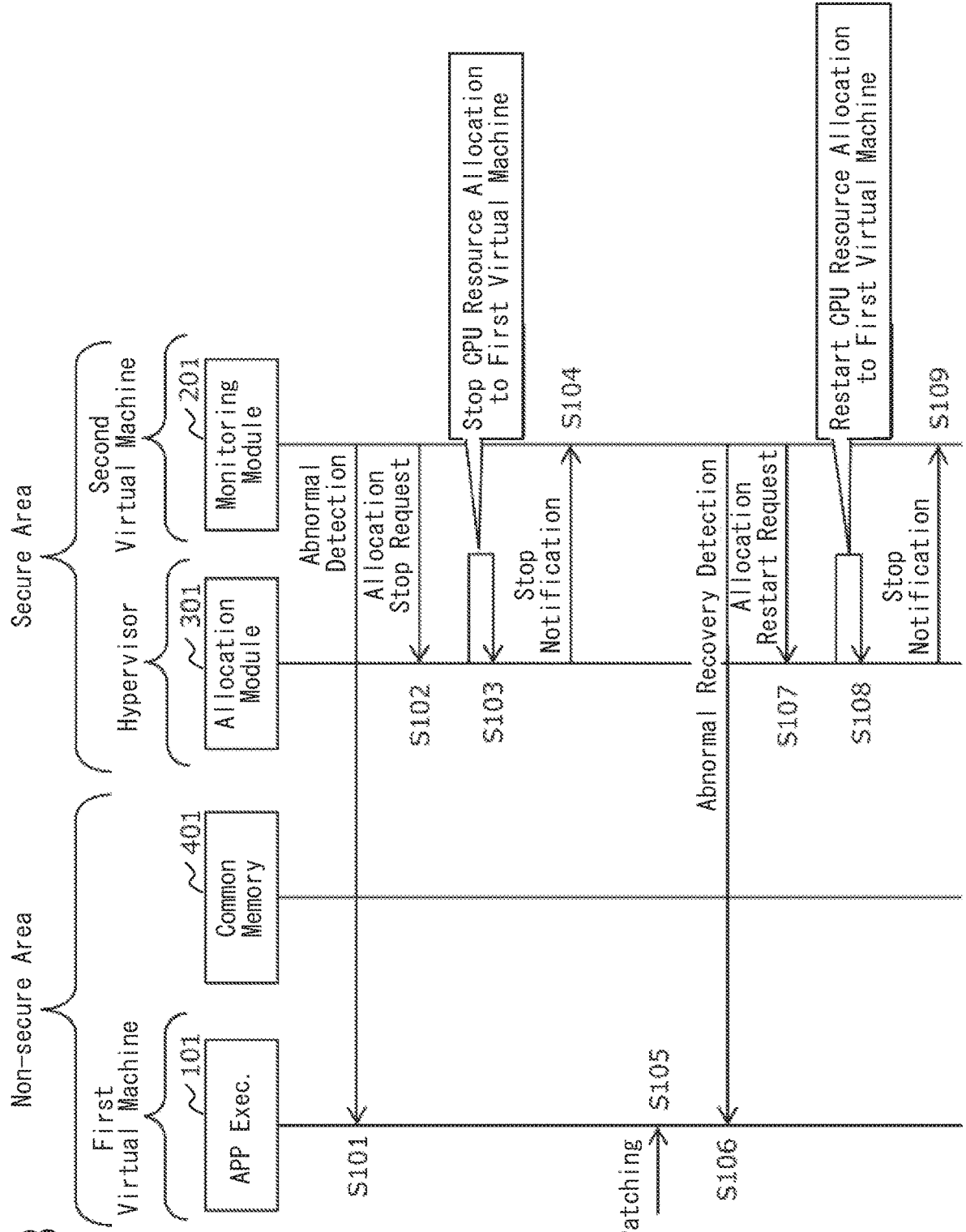
FIG. 3 is a diagram explaining an operation of the electronic control unit according to the first embodiment.

Next, the operation of the electronic control unit 10 of this embodiment will be described with reference to FIG. 3.

The monitoring module 201 provided in the second virtual machine 200 monitors whether an abnormality has occurred in the virtual machine in the non-secure area. Then, in a case that the monitoring module 201 detects an abnormality that has occurred in the first virtual machine 100 in step S101, the monitoring module 201 outputs an allocation stop request to the allocation control module 301 in step S102. The allocation stop request is an instruction to stop the allocation of the CPU resources to the first virtual machine 100 in which the abnormality has occurred.

In step S103, the allocation control module 301 stops the allocation of the CPU resources to the first virtual machine 100 "in response to" the allocation stop request output from the monitoring module 201. Then, in step S104, the allocation control module 301 outputs, to the monitoring module 201, a stop notification indicating that the CPU resource allocation to the first virtual machine 100 has been stopped.

Here, "in response to" in the present disclosure means that a predetermined process is performed as a result of given information or instruction. The word "in response to" may include a case in which the given information or instruction is directly received to perform the process. Alternatively, the word "in response to" may include a case in which the processing may be performed by receiving a result of the given information or instruction, that is, indirectly receiving the given information or instruction. The same applies hereafter. For example, to stop the allocation "in response to" the allocation stop request may include the operation control related to the allocation stop is performed using the allocation stop request. The allocation control module does not necessarily have to be receive a request to stop allocation directly from the monitoring module.

When the CPU resources allocation to the first virtual machine 100 is stopped in S103, the data transmission from the first virtual machine 100 is restricted. However, since the data transmitted to the first virtual machine 100 is DMA transferred to the common memory 401 by the DMA controller 402, a log data regarding the first virtual machine 100 is recorded in the common memory 401.

After that, in step S105, the abnormality is recovered by applying an abnormal recovery patch to the first virtual machine 100 in which the abnormality has occurred. In a case that the first virtual machine 100 is recovered from the abnormal, in step S106, the monitoring module 201 detects that the first virtual machine 100 has been recovered. Then, in step S107, the monitoring module 201 that has detected the recovery from the abnormality outputs an allocation restart request for requesting a restart of the allocation of the CPU resources to the first virtual machine 100 to the allocation control unit 301.

In step S108, the allocation control module 301 restarts the allocation of the CPU resources to the first virtual machine 100 "in response to" the allocation restart request output from the monitoring module 201. Then, in step S109, the allocation control module 301 outputs, to the monitoring module 201, a restart notification indicating that the CPU resource allocation to the first virtual machine 100 has been restarted.

According to the first embodiment, by stopping the allocation of the CPU resources to the first virtual machine 100 in which the abnormality has occurred, it is possible to ensure the security of other virtual machines in which the abnormality has not occurred. Furthermore, while the allocation of the CPU resources to the first virtual machine 100 is stopped, the data transmitted to the first virtual machine 100 can be recorded in the common memory 401 by the DMA transfer.

Modifications

In the first embodiment, the configuration in which the electronic control unit 10 has two virtual machines, that is, the first and second virtual machines 100 and 200 has been described. Alternatively, the electronic control unit 10 may have any number of virtual machines in either the secure area or the non-secure area. For example, the electronic control unit 10 may have a third virtual machine in the non-secure area. However, in this case, in a case that the allocation control module 301 receives the allocation stop request or the allocation restart request from the monitoring module 201, the allocation control module 301 can not recognize a target virtual machine to be stopped or restarted the allocation among the virtual machines, e.g., the first virtual machine or the third virtual machine.

Therefore, in a case that there are a plurality of virtual machines in the non-secure area, the monitoring module 201 may output an "identification information" for identifying the virtual machine in which the abnormality has occurred. For example, as a modification, the monitoring module 201 outputs the identification information in addition to the allocation stop request or the allocation restart request. The identification information may be a domain information of the virtual machine in which the abnormality is detected. Then, the allocation control module 301 identifies a target virtual machine for which the CPU resources allocation is controlled based on the virtual machine identification information. In addition, the allocation control module 301 stops or restarts the allocation of the CPU resources to the identified virtual machine.

Here, the "identification information" of the present disclosure may be any information that can identify a virtual machine, and is not limited to a so-called ID.

According to the above modification, even when the electronic control unit 10 provides two or more virtual machines in the non-secure area, the allocation control module 301 can recognize the virtual machine whose CPU resources allocation should be controlled.

Second Embodiment

According to the first embodiment, while the allocation of the CPU resources to the first virtual machine 100 is stopped, the data transmitted to the first virtual machine 100 can be recorded in the common memory 401 by the DMA transfer. However, since the common memory 401 is provided in the non-secure area, the data written in the common memory 401 may be tampered with or deleted by a cyber attack or the like.

Figure 4:
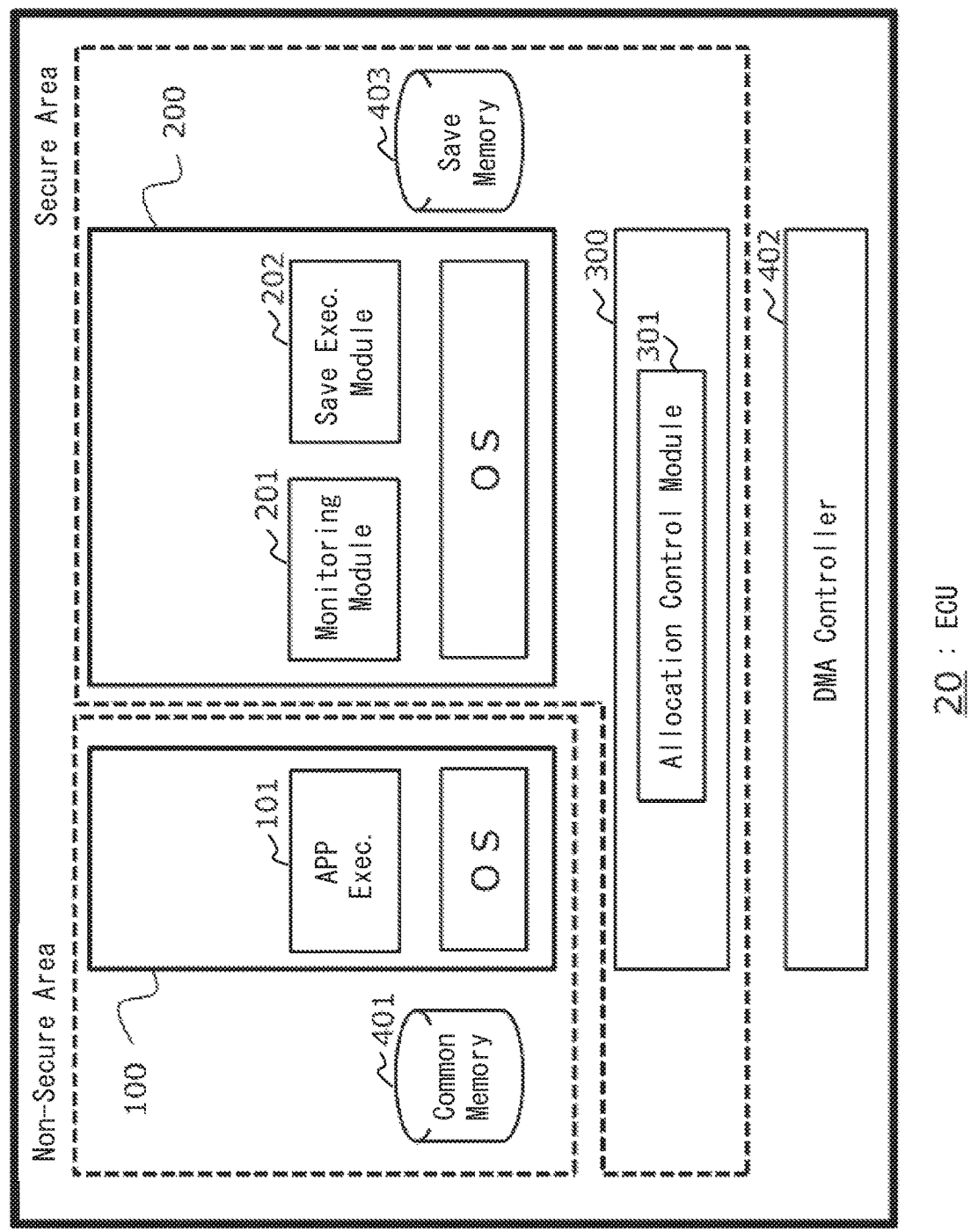
FIG. 4 is a block diagram explaining a configuration of the electronic control unit according to a second embodiment.

Therefore, in the second embodiment, the configuration of the electronic control unit capable of protecting the data recorded in the common memory 401 in the non-secure area will be described focusing on the differences from the first embodiment. Here, FIG. 4 shows an electronic control unit 20 of the second embodiment, and the same components as those of the first embodiment are designated by the same reference numerals.

Figure 2:
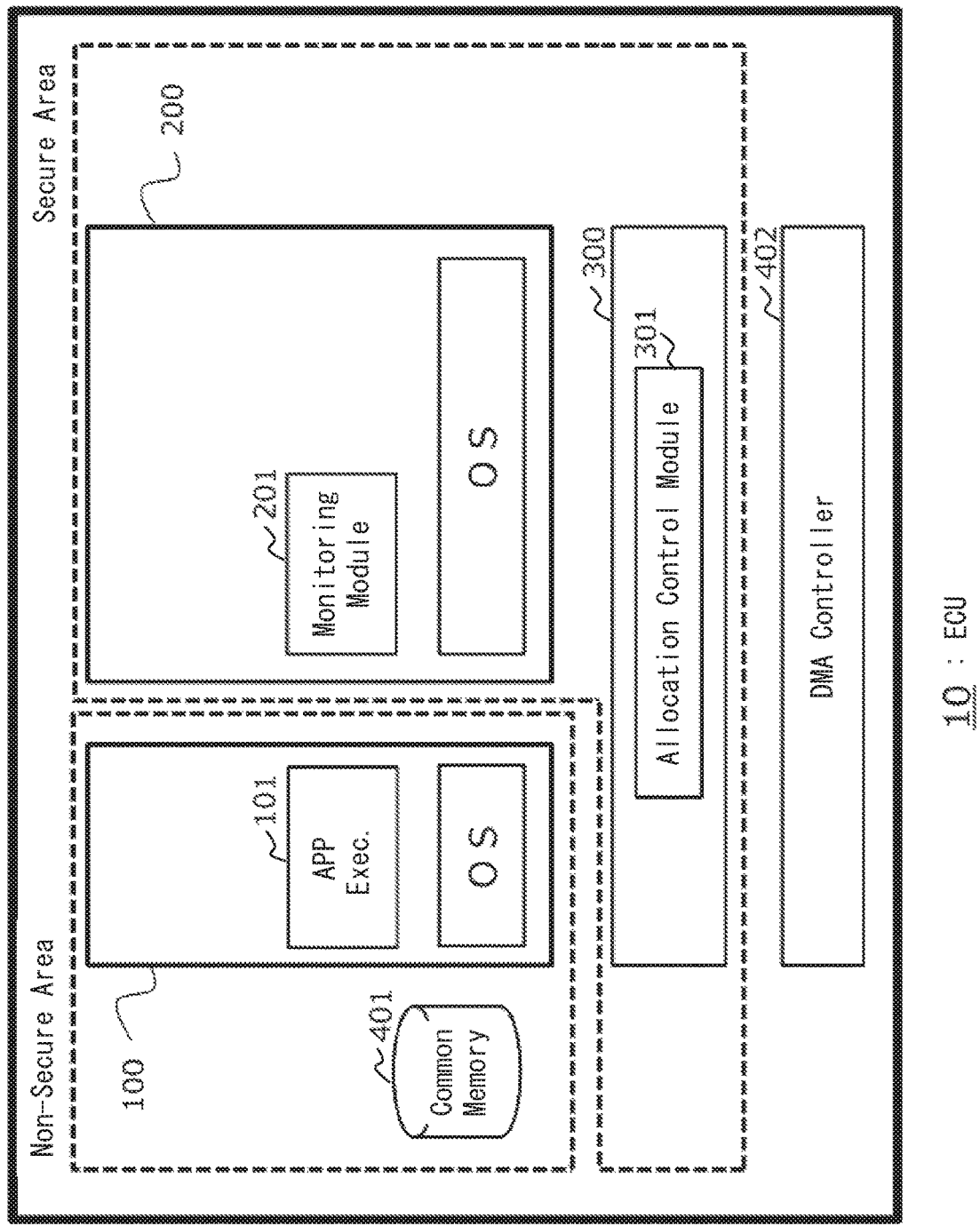
FIG. 2 is a block diagram explaining a configuration of an electronic control unit according to a first embodiment.

The electronic control unit 20 according to the second embodiment is different from the electronic control unit 10 according to the first embodiment shown in FIG. 2 in that a save execution module 202 and a save memory 403 are provided in the secure area. Note that in the electronic control unit 20 shown in FIG. 4, the save execution module 202 is provided in the second virtual machine 200 as with the monitoring module 201. The save execution module 202 may be provided in a virtual machine different from the monitoring module 201.

In the second embodiment, the monitoring module 201 detects an abnormality that has occurred in a virtual machine similar to the preceding embodiments. In a case that the monitoring module 201 detects an abnormality in a virtual machine, the monitoring module 201 outputs both a save request and the allocation stop request or the allocation restart request. The save request requests to save the data in the common memory 401 to the save memory 403.

The save execution module 202 executes a process of saving the data recorded in the common memory 401 to the save memory 403 "in response to" the save request from the monitoring module 201.

The save memory 403 is a random access memory or a flash memory provided in the secure area, and is a memory to which the data written in the common memory 401 is saved. Since the save memory 403 is provided in the secure area, the data written in the save memory 403 is unlikely to be tampered with by a cyber attack or the like, and the security is high.

Figure 5:
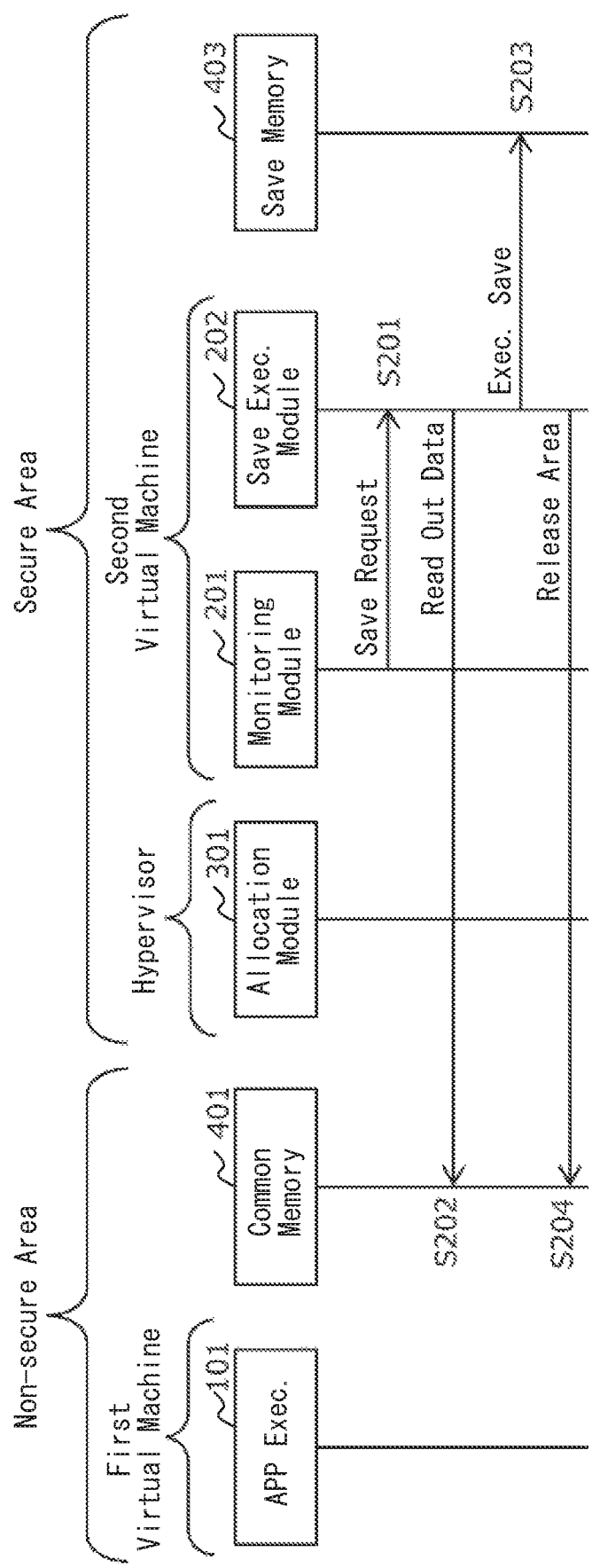
FIG. 5 is a diagram explaining an operation of the electronic control unit according to the second embodiment.

FIG. 5 shows a flow for saving the data recorded in the common memory to the save memory 403.

In the electronic control unit 20, the monitoring module 201 may detects an abnormality that has occurred in the first virtual machine 100. Then, in step 201, the save request for requesting is output from the monitoring module 201 to the save execution module 202. The save execution module 202 saves the data in the common memory 401 to the save memory 403 in response to the save request.

The save execution module 202 executes a process of saving the data recorded in the common memory 401 to the save memory 403 "in response to" the save request from the monitoring module 201. Specifically, the save execution module 202 reads out the data recorded in the common memory 401 in step S202. Then, the save execution module 202 "saves" the read data into the save memory 403 in step S203. Similar to the writing of data to the common memory 401, the saving of data from the common memory 401 to the save memory 403 is performed via a driver and the memory controller, but it is omitted in this description.

In the present disclosure, "saving" data means reading the data from the common memory 401 and writing the data in the save memory 403, and it does not matter whether the data saved in the common memory is deleted.

As shown in step S204 of FIG. 5, after the saving of the data to the save memory 403 is completed, the monitoring module 201 outputs a release area request to the common memory 401. The common memory 401 deletes and releases a memory area where the data saved to the save memory is stored in response to the release area request. The release area step may increase a usable free memory area in the common memory 401. It is desirable to release the area where the saved data was recorded, but this step is arbitrary.

In this way, in a case that the monitoring module 201 detects the abnormality in the first virtual machine 100, the data in the common memory 401 is saved to the save memory 403. As a result, it is possible to save a log data when an abnormality occurs in a secure manner.

A timing at which the monitoring module 201 outputs the save request after detecting the abnormality is arbitrary. The monitoring module 201 may output the save request within a time period between a stop of the allocation of the CPU resources to the first virtual machine 100 and a restart of the allocation of the CPU resources to the first virtual machine 100. For example, the monitoring module 201 outputs the save request after outputting the allocation stop request and before outputting the allocation restart request, that is, outputs the save request between step S102 and step S107 shown in FIG. 3. The save execution module 202 executes a series of processing shown in FIG. 5. Alternatively, the monitoring module 201 may execute the process shown in FIG. 5 by using the detection of the recovery of the abnormality that has occurred in the first virtual machine 100 as a trigger. Step S106 in FIG. 3 is used as the trigger.

In this case, more CPU resources may be reallocated to the second virtual machine 200 while the allocation of CPU resources to the first virtual machine 100 is stopped. Therefore, the second virtual machine 200 may optimally perform a save processing by the save execution module 202 by using more CPU resources reallocated.

Further, it is more preferable that the monitoring module 201 outputs the save request "subsequent to" the output of the stop request to stop the allocation of the CPU resources to the first virtual machine 100. For example, the monitoring module 201 outputs the save request immediately after outputting the stop request in step S102 shown in FIG. 3. Alternatively, the monitoring module 201 outputs the same request to the save execution module 202 as soon as the monitoring module 201 receives the stop notification from the allocation control module 301 in step S104 illustrated in FIG. 3. The stop notification indicates that the CPU resource allocation to the first virtual machine 100 has been stopped. The electronic control unit 20 executes the series of processing shown in FIG. 5.

In this case, the save action is executed with the stop of the allocation of the CPU resources for the first virtual machine 100 as a trigger. It is possible to save the data regardless the abnormality continues or is recovered. If a recovery from the abnormality of the first virtual machine 100 is used as the trigger to output the save request, it is impossible to output the save request in a case that the first virtual machine 100 cannot be recovered from the abnormality.

Here, "subsequent to" the output of the stop request according to the present disclosure means a relatively wide period of time that includes variety of possible cases. For example, one possible case may be that the output of the save request is performed immediately after the stop request without delay. For example, one possible case may be that the output of the save request is performed without delay after a preparation of the monitoring module 201 is completed after the stop notification is detected.

Third Embodiment

In the second embodiment, the data stored in the common memory 401 can be protected by saving the data from the common memory 401 to the save memory 403. However, since there is a limit to a free memory area of the save memory 403, if the save processing is performed in a state where there is not enough free memory space in the save memory 403, the data from the common memory 401 to the save memory 403 may not be appropriately saved and may be lost. Therefore, in the third embodiment, a configuration will be described in which the data saved in the save memory 403 is appropriately transferred to a storage provided on an outside of the electronic control unit.

Figure 6:
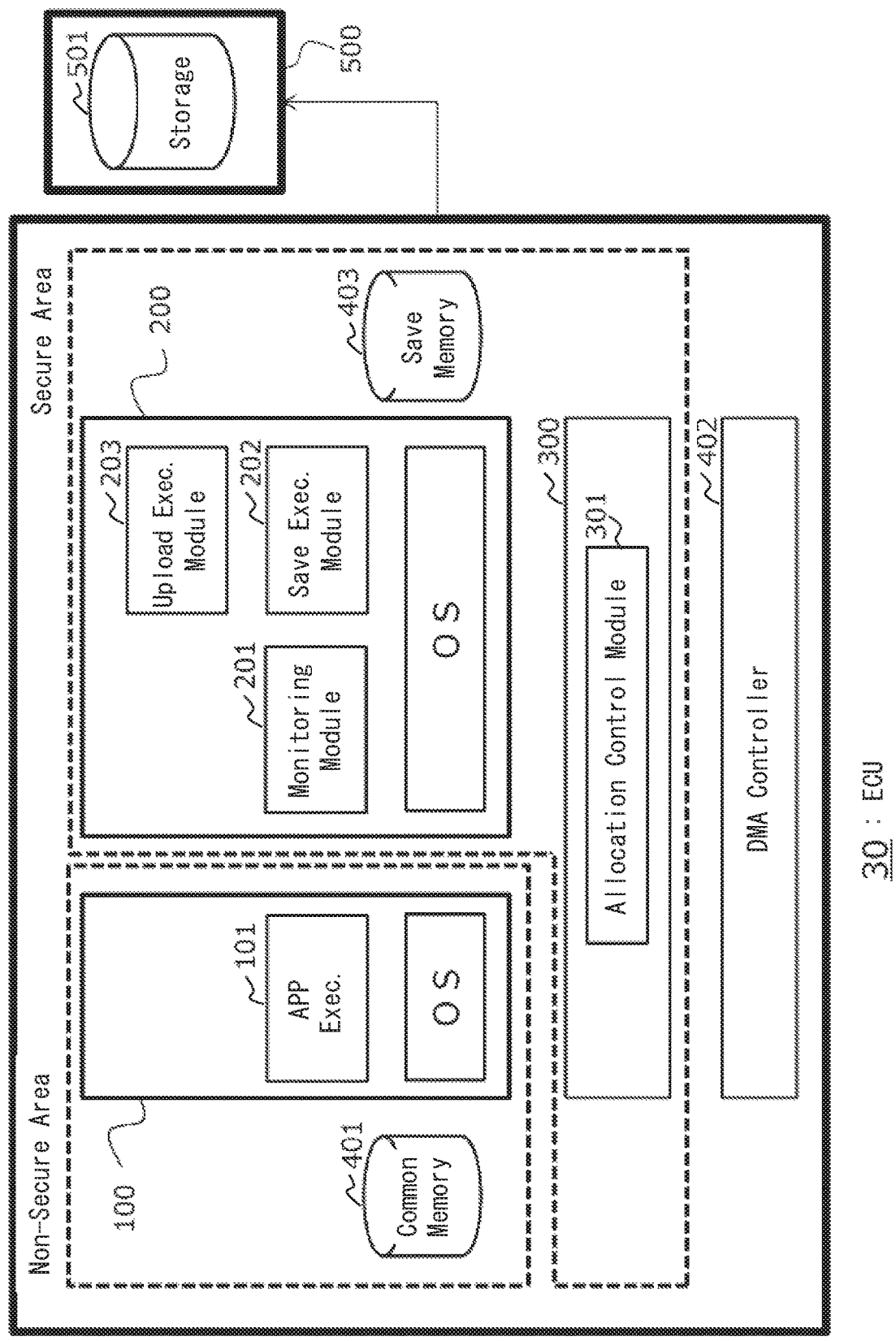
FIG. 6 is a block diagram explaining a configuration of an electronic control unit according to a third embodiment.

FIG. 6 illustrates the electronic control unit 30 of the third embodiment. The electronic control unit 30 is different from the electronic control unit 20 of FIG. 4 in that the electronic control unit 30 includes an upload execution module 203 provided in the secure area. Further, FIG. 6 shows a server 500 having a storage 501, which is connected to the electronic control unit 30 by wire or wireless. The server 500 is a storage provided on an outside of the electronic control unit 30. The server 500 is still a component of the electronic control system. The server 500 may be mounted on a vehicle as a component of the in-vehicle electronic control system 1. In this case, the server 500 is connected to the electronic control unit 30 via the communication network 2. Alternatively, the server 500 may be an external server externally provided on an outside location of the vehicle. In this case, the server 500 is connected to the electronic control unit 30 via a wireless network such as the internet and the communication network 2.

The upload execution module 203 in the electronic control unit 30 transfers the data saved in the save memory 403 to the storage 501. Then, in a case that the transfer of the data from the save memory 403 to the storage 501 is completed, the upload execution module 203 deletes the data from the save memory 403. In FIG. 6, the upload execution module 203 is provided in the second virtual machine 200. Alternatively, the upload execution module 203 may be provided in a virtual machine different from the second virtual machine 200 having the monitoring module 201 or the save execution module 202 as long as a virtual machine is within the secure area.

Data transfer from the save memory 403 to the storage 501 can be executed at any timing. For example, the upload execution module 203 periodically transfers data to the storage 501. Alternatively, the upload execution module 203 may transfer the data in the save memory 403 to the storage 501 without delay after the data is saved from the common memory 401 to the save memory 403.

As described above, according to the present modification, the data saved in the save memory 403 is appropriately transferred to the storage 501 provided on an outside of the electronic control unit. It is possible to provide a usable free memory space in the save memory 403 in order to save the data transferred from the common memory 401. It is possible to prevent a situation that the data cannot be saved from the common memory 401 to the save memory 403.

Each of the embodiments is premised on an electronic control unit that constitutes an in-vehicle electronic control system mounted on a vehicle, but the present disclosure also includes an electronic control unit other than the in-vehicle electronic control system. The electronic control unit may be referred to as an information processing device.

CONCLUSION

The features of the electronic control unit according to each embodiment of the present disclosure have been described above. Although the features of the plurality of embodiments and their modifications have been described, two or more features of each embodiment and its modifications may be included.

In a case where either the master electronic control unit 3 or the slave electronic control unit 4 constituting the in-vehicle electronic control system 1 shown in FIG. 1 has configurations and functions of the electronic control unit of the first to third embodiments, it is possible to improve the security of the master electronic control unit 3 or the slave electronic control unit 4. In particular, the electronic control unit of the present disclosure may be applied to the master electronic control unit 3. In this case, it is possible to improve the security of the master electronic control unit 3. In addition, it is possible to improve the security of the slave electronic control unit 4 which is operated under instructions of the master electronic control unit 3. Further, it is possible to store the data transferred to the virtual machine which becomes abnormal.

Further, both the master electronic control unit 3 and the slave electronic control unit 4 may have the configurations and functions of the electronic control unit of the first and second embodiments. In this case, it is possible to improve the security of the in-vehicle system 1 as a whole and store the data relative to the virtual machine which becomes abnormal. Alternatively, only a specific electronic control unit alone may adopt the electronic control unit of the present disclosure. For example, only the master electronic control unit alone may adopt the electronic control unit of the present disclosure. Alternatively, the electronic control unit of the present disclosure may be employed only for certain electronic control unit, e.g., the master electronic control unit and some slave electronic control units, such as an electronic control unit essential to run the vehicle and an electronic control unit that handles important data, so that the data can be secured while increasing the security of certain electronic control unit.

Examples of the electronic control device according to the present disclosure include a semiconductor device, an electronic circuit, a module, and a microcomputer. In addition, necessary functions such as an antenna and a communication interface may be added to these devices. Moreover, it may be also possible to provide features such as a car navigation system, a smartphone, a personal computer, and a portable information terminal.

In addition, the present disclosure may be realized not only by the above-described special purpose hardware, but also by a combination of a program recorded in a storage medium such as a memory or a hard disk and a hardware including a memory and a dedicated or general purpose CPU which can execute the program.

The program stored in the storage area of dedicated or general purpose hardware can also be provided to the dedicated or general-purpose hardware (equivalent to a computer) described above via a recording medium or via a communication line from the server without a recording medium. The program may be stored in the hardware such as an external storage device, e.g., hard disk, USB memory, etc., or an internal storage device, e.g., RAM, ROM, etc. As a result, it is possible to provide a latest function by updating the program.

As explained above, an ordinary skilled person in this art field should understand that the preceding embodiments are enough to interpret the following technical configurations.

An electronic control unit comprising: at least one processor which provide CPU resources, the CPU resources being subject to an allocation to provide a plurality of virtual machines under a management by a hypervisor; and at least one common memory which is common among the plurality of virtual machines, wherein the electronic control unit is configured to perform: allocating the CPU resources to provide the plurality of virtual machines under by the hypervisor; monitoring an abnormality that occurs in one specific virtual machine of the plurality of virtual machines by another virtual machine different from the specific virtual machine; outputting a stop request that requests stop of the allocation of the CPU resources to the specific virtual machine in a case that the abnormality is detected; and stopping allocation of the CPU resources to the specific virtual machine, by the hypervisor, in response to the stop request, and wherein the electronic control unit further comprises a DMA controller which enables a Direct Memory Access, wherein the DMA controller transfers data transmitted to the specific virtual machine whose CPU resource allocation has been stopped to the common memory by the Direct Memory Access.

In the electronic control unit recited above, wherein the electronic control unit is further configured to perform: detecting that the specific virtual machine has been recovered from the abnormality; and outputting a restart request that requests restart of allocation of the CPU resources to the specific virtual machine in a case that the recovery is detected, and wherein the hypervisor restarts allocation of the CPU resources to the specific virtual machine in response to the restart request.

In the electronic control unit recited above, wherein the electronic control unit has a non-secure area and a secure area, and wherein the common memory is provided in the non-secure area, and wherein the other virtual machine and the hypervisor are provided in the secure area.

In the electronic control unit recited above, wherein the electronic control unit has a non-secure area and a secure area, and wherein the electronic control unit further comprises a save memory in the secure area, wherein the electronic control unit is further configured to perform: outputting a save request that requests save the data in the common memory to the save memory in a case that the abnormality is detected the specific virtual machine; and saving the data in the common memory to the save memory in response to the save request.

In the electronic control unit recited above, wherein outputting the save request is performed subsequent to outputting the stop request.

In the electronic control unit recited above, wherein the electronic control unit has a non-secure area and a secure area, and wherein the electronic control unit further comprises a save memory in the secure area, wherein the electronic control unit is further configured to perform: outputting a save request that requests save the data in the common memory to the save memory after outputting the stop request and before outputting the restart request; and saving the data in the common memory to the save memory in response to the save request.

In the electronic control unit recited above, wherein the electronic control unit is further configured to perform uploading the data saved in the save memory to a storage provided on an outside of the electronic control unit.

In the electronic control unit recited above, wherein the electronic control unit is further configured to perform outputting an identification information to identify the specific virtual machine in addition to the stop request.

An electronic control system comprising: a master electronic control unit; and a slave electronic control unit connected to the master electronic control unit via a communication network and controlled by the master electronic control unit, wherein at least one of the master electronic control unit and the slave electronic control unit comprising: at least one processor which provide CPU resources, the CPU resources being subject to an allocation to provide a plurality of virtual machines under a management by a hypervisor; and at least one common memory which is common among the plurality of virtual machines, wherein the electronic control unit performs: allocating the CPU resources to provide a plurality of virtual machines under a management by a hypervisor; monitoring an abnormality that occurs in one specific virtual machine of the plurality of virtual machines by another virtual machine different from the specific virtual machine; outputting a stop request that requests stop of the allocation of the CPU resources to the specific virtual machine in a case that the abnormality is detected; and stopping allocation of the CPU resources to the specific virtual machine, by the hypervisor, in response to the stop request, and wherein the electronic control unit further comprises a DMA controller which enables a Direct Memory Access, wherein the DMA controller transfers data transmitted to the specific virtual machine whose CPU resource allocation has been stopped to the common memory by performing the Direct Memory Access.

A method performed in an electronic control unit including at least one processor which provide CPU resources, the CPU resources being subject to an allocation to provide a plurality of virtual machines under a management by a hypervisor and at least one common memory which is common among the plurality of virtual machines, the method comprising: providing a plurality of virtual machines by allocating the CPU resources provided by the processor in the electronic control unit under a management by a hypervisor; detecting an abnormality that occurred in one specific virtual machine among the plurality of virtual machines; outputting a stop request that stops an allocation of the CPU resources to the specific virtual machine in a case that the abnormality is detected; stopping the allocation of the CPU resources to the specific virtual machine in response to the stop request; and transferring by Direct Memory Access data transmitted to the specific virtual machine whose CPU resource allocation has been stopped to a common memory which is common among the plurality of virtual machines.

A non-transitory computer-readable storage medium storing instructions which, when executed by a computer, cause the computer to perform a method of an electronic control unit, the method comprises: providing a plurality of virtual machines by allocating the CPU resources provided by the processor in the electronic control unit under a management by a hypervisor; detecting an abnormality that occurred in one specific virtual machine among the plurality of virtual machines; outputting a stop request that stops an allocation of the CPU resources to the specific virtual machine in a case that the abnormality is detected; stopping the allocation of the CPU resources to the specific virtual machine in response to the stop request. The instructions may be installed into a computer having a DMA controller which enables a Direct Memory Access, wherein the DMA controller transfers data transmitted to the specific virtual machine whose CPU resource allocation has been stopped to the common memory by performing the Direct Memory Access. Further, in a case that the DMA controller is programmable, the instructions stored in the non-transitory computer-readable storage medium may include instructions to cause the DMA controller to perform a method comprises transferring data transmitted to the specific virtual machine whose CPU resource allocation has been stopped to the common memory by performing the Direct Memory Access.

INDUSTRIAL APPLICABILITY

The electronic control unit according to the present disclosure has been described mainly as an on-vehicle electronic control unit mounted on an automobile, but the electronic control unit may be applied to general moving bodies such as a motorcycle, a ship, a railroad vehicle, and an aircraft. Further, the present invention is applicable not only to mobile objects but also to general products including microcomputers.

What is claimed is:

1. An electronic control unit comprising:
   at least one processor that provides CPU resources, the CPU resources being subject to an allocation to provide a plurality of virtual machines under management by a hypervisor; and
   at least one common memory common among the plurality of virtual machines; wherein:
   the electronic control unit is configured to perform:
      allocating the CPU resources to provide the plurality of virtual machines under management by the hypervisor;
      monitoring an abnormality that occurs in one specific virtual machine of the plurality of virtual machines by another virtual machine different from the specific virtual machine;
      outputting a stop request to stop the allocation of the CPU resources to the specific virtual machine in response to the abnormality being detected; and
      stopping allocation of the CPU resources to the specific virtual machine, by the hypervisor, in response to the stop request;
   the electronic control unit further comprises a DMA controller that enables Direct Memory Access, wherein the DMA controller transfers data transmitted to the specific virtual machine whose CPU resource allocation has been stopped to the common memory by Direct Memory Access;
   the electronic control unit has a non-secure area and a secure area;
   the electronic control unit further comprises a save memory in the secure area;
   the electronic control unit is further configured to perform:
      outputting a save request that requests saving of the data in the common memory to the save memory in response to the abnormality being detected in the specific virtual machine; and
      saving the data in the common memory to the save memory in the secure area as log data indicating a history of the abnormality in the specific virtual machine in response to the save request.

2. The electronic control unit claimed in claim 1, wherein the electronic control unit is further configured to perform:
   detecting that the specific virtual machine has been recovered from the abnormality; and
   outputting a restart request that requests restart of allocation of the CPU resources to the specific virtual machine in a case that the recovery is detected, and wherein
   the hypervisor restarts allocation of the CPU resources to the specific virtual machine in response to the restart request.

3. The electronic control unit claimed in claim 1, wherein the electronic control unit has a non-secure area and a secure area, and wherein
   the common memory is provided in the non-secure area, and wherein
   the other virtual machine and the hypervisor are provided in the secure area.

4. The electronic control unit claimed in claim 1, wherein outputting the save request is performed subsequent to outputting the stop request.

5. The electronic control unit claimed in claim 2, wherein the electronic control unit has a non-secure area and a secure area, and wherein
   the electronic control unit further comprises a save memory in the secure area, wherein
   the electronic control unit is further configured to perform:
   outputting a save request that requests save the data in the common memory to the save memory after outputting the stop request and before outputting the restart request; and
   saving the data in the common memory to the save memory in response to the save request.

6. The electronic control unit claimed in claim 1, wherein the electronic control unit is further configured to perform uploading the data saved in the save memory to a storage provided on an outside of the electronic control unit.

7. The electronic control unit claimed in claim 1, wherein the electronic control unit is further configured to perform:
   outputting identification information to identify the specific virtual machine in addition to the stop request.

8. An electronic control system comprising:
   a master electronic control unit; and
   a slave electronic control unit connected to the master electronic control unit via a communication network and controlled by the master electronic control unit, wherein
   at least one of the master electronic control unit and the slave electronic control unit comprises:
   at least one processor that provides CPU resources, the CPU resources being subject to an allocation to provide a plurality of virtual machines under management by a hypervisor; and
   at least one common memory common among the plurality of virtual machines, wherein
   the master electronic control unit performs:
      allocating the CPU resources to provide a plurality of virtual machines under management by the hypervisor;

monitoring an abnormality that occurs in one specific virtual machine of the plurality of virtual machines by another virtual machine different from the specific virtual machine;

outputting a stop request to stop the allocation of the CPU resources to the specific virtual machine in response to the abnormality being detected; and stopping allocation of the CPU resources to the specific virtual machine, by the hypervisor, in response to the stop request, and wherein the master electronic control unit further comprises a DMA controller that enables Direct Memory Access, wherein the DMA controller transfers data transmitted to the specific virtual machine whose CPU resource allocation has been stopped to the common memory by Direct Memory Access, wherein the master electronic control unit has a non-secure area and a secure area, the master electronic control unit further comprises a save memory in the secure area, and the master electronic control unit is further configured to perform:

outputting a save request that requests saving of the data in the common memory to the save memory in response to the abnormality being detected in the specific virtual machine; and saving the data in the common memory to the save memory in the secure area as log data indicating a history of the abnormality in the specific virtual machine in response to the save request.

9. A method performed in an electronic control unit including at least one processor that provides CPU resources, the CPU resources being subject to an allocation to provide a plurality of virtual machines under management by a hypervisor and at least one common memory that is common among the plurality of virtual machines, the method comprising:

providing a non-secure area including the common memory and a secure area including a save memory in the electronic control unit;

providing a plurality of virtual machines by allocating the CPU resources provided by the processor in the electronic control unit under management by the hypervisor;

detecting an abnormality that occurred in one specific virtual machine among the plurality of virtual machines;

outputting a stop request that stops an allocation of the CPU resources to the specific virtual machine in response to the abnormality is detected;

stopping the allocation of the CPU resources to the specific virtual machine in response to the stop request;

transferring by Direct Memory Access data transmitted to the specific virtual machine whose CPU resource allocation has been stopped to the at least one common memory that is common among the plurality of virtual machines, outputting a save request that requests saving of the data in the common memory to the save memory in response to the abnormality being detected in the specific virtual machine; and saving the data in the common memory to the save memory in the secure area as log data indicating a history of the abnormality in the specific virtual machine in response to the save request.

* * * * *